United States Patent
Moser et al.

(10) Patent No.: US 8,019,563 B2
(45) Date of Patent: Sep. 13, 2011

(54) METHOD FOR DETERMINING THE EXHAUST GAS TEMPERATURE OF AN INTERNAL COMBUSTION ENGINE

(75) Inventors: Eduard Moser, Ludwigsburg (DE); Florian Dencker, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 12/204,014

(22) Filed: Sep. 4, 2008

(65) Prior Publication Data

US 2009/0093989 A1 Apr. 9, 2009

(30) Foreign Application Priority Data

Sep. 5, 2007 (DE) .......................... 10 2007 042 227

(51) Int. Cl.
*G01K 15/00* (2006.01)
*G01D 18/00* (2006.01)
(52) U.S. Cl. .................... 702/99; 702/104; 73/1.59
(58) Field of Classification Search ................ 702/132
See application file for complete search history.

(56) References Cited

U.S. PATENT DOCUMENTS

| 4,953,351 | A | * | 9/1990 | Motz et al. .................... 60/285 |
| 5,129,258 | A | * | 7/1992 | Homeyer .................. 73/114.73 |
| 5,854,079 | A | * | 12/1998 | Kato ............... 436/152 |
| 6,145,302 | A | * | 11/2000 | Zhang et al. .................... 60/274 |
| 6,398,407 | B2 | * | 6/2002 | Hashimoto .................. 374/144 |
| 2005/0090966 | A1 | * | 4/2005 | Strom et al. .................. 701/109 |
| 2005/0216176 | A1 | * | 9/2005 | Ichimoto et al. ............. 701/112 |
| 2006/0005819 | A1 | * | 1/2006 | Barba et al. ............. 123/568.21 |
| 2006/0137436 | A1 | * | 6/2006 | Buck et al. ..................... 73/116 |
| 2007/0119242 | A1 | * | 5/2007 | Buck et al. .................... 73/118.1 |
| 2007/0163557 | A1 | * | 7/2007 | Layher et al. ............. 123/73 PP |
| 2009/0114199 | A1 | * | 5/2009 | Jung .................... 123/676 |

* cited by examiner

*Primary Examiner* — Jonathan Teixeira Moffat
(74) *Attorney, Agent, or Firm* — Kenyon & Kenyon LLP

(57) ABSTRACT

A method for determining an exhaust gas temperature of an internal combustion engine, which is performed by measuring a lambda value of the exhaust gas of the internal combustion engine and calculating a calculated exhaust gas temperature as a function of the measured lambda value, and comparing the calculated exhaust gas temperature with a measured exhaust gas temperature and adapting a function used for the calculation as a function of the comparison.

9 Claims, 2 Drawing Sheets

METHOD FOR DETERMINING THE EXHAUST GAS TEMPERATURE OF AN INTERNAL COMBUSTION ENGINE

RELATED APPLICATION INFORMATION

The present application claims priority to and the benefit of German patent application no. 102007042227.1, which was filed in Germany on Sep. 5, 2007, the disclosure of which is incorporated herein by reference.

FIELD OF THE INVENTION

The present invention relates to a method for determining an exhaust gas temperature of an internal combustion engine and to a device for carrying out a method of this type, and also to a computer program.

BACKGROUND INFORMATION

To achieve maximum output in internal combustion engines, turbochargers of the internal combustion engines are operated very close to their thermal limit. To monitor the exhaust temperature (hereinafter also referred to as T3), an exhaust gas temperature sensor may be used to vary combustion parameters of the internal combustion engine if the turbocharger is at risk of overheating.

The disadvantage of the aforementioned method is that the exhaust gas temperature sensor has a significant delay, and therefore reliable protection of the turbocharger through these means may be ensured only to a limited extent.

The use of a lambda sensor, which is present in any case, to limit the exhaust gas temperature, is also known from the related art. The lambda value measured by the lambda sensor may be used as a reference point for the exhaust gas temperature. The advantage of this method is that the lambda sensor is highly dynamic, i.e., it is suitable for carrying out lambda value measurements in rapid succession. However, the disadvantage is that the exhaust gas temperature is only imprecisely ascertainable from the lambda value, since this temperature is also dependent on other influencing factors, so that the temperature estimate using the lambda value has a tolerance of approximately +/−50 K. Such a high tolerance is unsatisfactory.

SUMMARY OF THE INVENTION

An object of the exemplary embodiments and/or exemplary methods of the present invention is to provide an improved method and an improved device as well as a computer program, each of which may be used to determine the exhaust gas temperature in a highly dynamic manner, while simultaneously minimizing the tolerance.

Another object of the exemplary embodiments and/or exemplary methods of the present invention is generally to improve the methods and devices known from the related art.

The aforementioned object may be achieved by a method for determining an exhaust gas temperature of an internal combustion engine, including the following steps: measurement of a lambda value of the exhaust gas of the internal combustions engine; calculation of a calculated exhaust gas temperature as a function of the measured lambda value; comparison of the calculated exhaust gas temperature with a measured exhaust gas temperature; and adaptation of a function used for the calculation as a function of the comparison.

A function in this regard is understood to be a functional relationship between the lambda value and the exhaust gas temperature. A function of this type may also be generally provided in the form of an interpolatable table. The measured exhaust gas temperature is measured using a conventional exhaust gas temperature sensor. The lambda value is measured using a known lambda sensor and provides an indication of the chemical composition of the exhaust gas. It is provided that the method is repeated multiple times so that the adaptation of the function used for the calculation has an effect on a subsequent calculation, giving the subsequent calculation a higher degree of accuracy. This is one advantage of the method according to the present invention. A further advantage is the fact that the exhaust gas temperature may be determined highly dynamically, since the lambda sensor supplies prompt measured values for the lambda value in quick succession. The function may be adapted, for example by adjusting a parameter, such as a prefactor for the lambda value used as the input parameter.

The exhaust gas temperature is advantageously measured for the comparison when the internal combustion engine is operated at an essentially steady-state operating point. This has the advantage in that the comparison is not influenced by inaccuracies caused by a time shift between the measurement of the lambda value and the measurement of the exhaust gas temperature. Another source of inaccuracies during non-steady-state operation of the internal combustion engine may result from the fact that the exhaust gas temperature, for example, follows a hysteresis when the load on the internal combustion engine is increased. An essentially steady-state operating point is understood to be a quasi-steady-state operating point, i.e., the internal combustion engine is operated, for example, under an essentially constant load at essentially constant temperatures. This may involve operating a vehicle driven by the internal combustion engine on the highway at a constant speed on the level. The terms "essentially constant" and "quasi-steady-state" in this context are understood to mean that the operating point or the particular parameters remain within determined tolerance limits for a determined period of time. The determined period of time may be selected in such a way that delayed variations in the exhaust gas temperature may be ruled out.

A plurality of comparisons may be carried out, the adaptation of the function including an interpolation between these comparisons or an extrapolation beyond these comparisons. The comparisons may be carried out at different operating points of the internal combustion engine, i.e., one measured exhaust gas temperature and one calculated exhaust gas temperature are ascertained and compared at different operating points of the internal combustion engine. In this case, different comparison values, i.e., calculated exhaust gas temperatures and measured exhaust gas temperatures, may be recorded at different operating points of the internal combustion engine over a longer period of time for the purpose of adapting the function used for the calculation with the help of these multiple interpolation values or interpolation points, i.e., of the errors of the function calculated from the comparisons.

Care is advantageously taken to ensure that ascertained value pairs of the calculated exhaust gas temperature and the measured exhaust gas temperature are sufficiently far apart, i.e., that the parameters of these value pairs do not lie within a tolerance range of the parameters of the particular other value pair. This is done for the purpose of minimizing the computational effort required to adapt the function. Value pairs which are essentially equally distributed over a parameter range may be collected, taking into account the fact that a value-pair determination or interpolation-point determination probably does not take place for extreme operating points of the internal combustion engine. The function is adapted for a predetermined, sufficient number of value pairs.

In addition to the lambda value, the rotational speed of the internal combustion engine, the intake air temperature of the internal combustion engine, and the temperature of the internal combustion engine may be additional parameters of the function. The temperature of the internal combustion engine may be an oil temperature of the internal combustion engine. This provides the advantage that the calculation of the calculated exhaust gas temperature becomes more accurate. In particular, it has been shown in practice that the dependency of the relationship between the lambda value and the exhaust gas temperature may also vary as a function of the rotational speed of the internal combustion engine, due to system-specific tolerances or over the course of the life of the internal combustion engine.

Based on the thermal system of the internal combustion engine, the following physical relationships may generally be ascertained, which make it possible to establish a functional relation, i.e., the function for the exhaust temperature as a function of different parameters, in particular the parameters mentioned above. Thus, heat flow ΔQ must be estimated as $$\Delta Q \sim c_w \times \Delta m_L \times \Delta T_3, \quad (1)$$

where $c_w$ is the thermal coefficient of the exhaust gas, $m_L$ is the air mass, and $T_3$ is the exhaust gas temperature.

Furthermore, heat flow ΔQ is the product of the injection quantity ($m_E$=injection mass) and the calorific value of the combusted fuel ($H_u$=calorific value of fuel mass):

$$\Delta Q \sim H_u * \Delta m_E. \quad (2)$$

In using these equations and other physical relationships, such as the relationship between the air mass, the rotational speed of the internal combustion engine (m), and the temperature of the intake air ($T_{air}$ or $T_2$), the following relationship may be established:

$$T3=a(1/\lambda, n)+b_1(q, n)*b_2(T_{air}, n)+c_1(q, n)*c_2(n, T_{oil}). \quad (3)$$

In this case, q is the setpoint injection quantity and $T_{oil}$ is the oil temperature of the internal combustion engine. According to the exemplary embodiments and/or exemplary methods of the present invention, at least one of the subfunctions from a, $b_1$, $b_2$, $c_1$ and $c_2$ may now be adapted.

As described above, the function advantageously includes subfunctions, only a fraction of all the subfunctions being adapted. It has been demonstrated that most of the subfunctions of the functional relationship addressed above (3), i.e., of the function for the exhaust gas temperature, are subject to parameter scatter only to a limited extent. This applies, in particular to $b_1$, $b_2$, $c_1$ and $c_2$. This provides the advantage that the function adaptation may be simplified. Particular advantages also arise when only one subfunction is adapted. One of the adapted subfunctions may have only the lambda value or the rotational speed of the internal combustion engine as a parameter. It particularly may be the case that only the subfunction which has the lambda value and the rotational speed of the internal combustion engine as parameters is adapated. In the case of the function for the exhaust gas temperature addressed above, this is only subfunction a. It may also be that is not subfunction a itself which is adapted, but rather an additional subfunction d(1/λ, n) is introduced, which performs the adaptive correction. The formula for the exhaust gas temperature is then as follows:

$$T3=a(1/\lambda, n)+b_1(q, n)*b_2(T_{air}, n)+c_1(q, n)*c_2(n, T_{oil})+\\ d(1/\lambda, n). \quad (4)$$

At least one of the subfunctions may be ascertained ahead of time in a different internal combustion engine. The term "different internal combustion engine" means the so-called "golden engine," for example an internal combustion engine of the same type, which was tested on a test bench or during defined test drives for the purpose of ascertaining the subfunctions. Thus, functions a, $b_1$, $b_2$, $c_1$ and $c_2$ may be ascertained ahead of time (see equation (3) above), and the adaptation is then carried out via corrective subfunction d(1/λ, n) during the operation. This corrective subfunction d is first initialized at 0.

A method according to the present invention may be used to implement a protection method for the thermal protection of a turbocharger of the internal combustion engine, the following steps also being advantageously carried out: checking whether the exhaust gas temperature exceeds a certain threshold value and varying a combustion parameter of the internal combustion engine if the check shows an overshooting, so that the exhaust gas temperature drops below the threshold value. A protection method of this type provides, in particular, the advantage that the fast calculation of the exhaust gas temperature makes it possible to effectively protect the turbocharger.

Another exemplary embodiment of the present invention is a device, in particular a control unit or an internal combustion engine, which is configured to carry out a method according to the present invention, having one or more of the aforementioned features.

Another exemplary embodiment of the present invention is a computer program including program code for carrying out all steps in a method according to the present invention, having one or more of the aforementioned advantageous features, when the program is executed on a computer. The computer program may be a program code for an engine controller.

An exemplary embodiment of the present invention is explained in greater detail below on the basis of the attached drawings.

DETAILED DESCRIPTION

Figure 1:
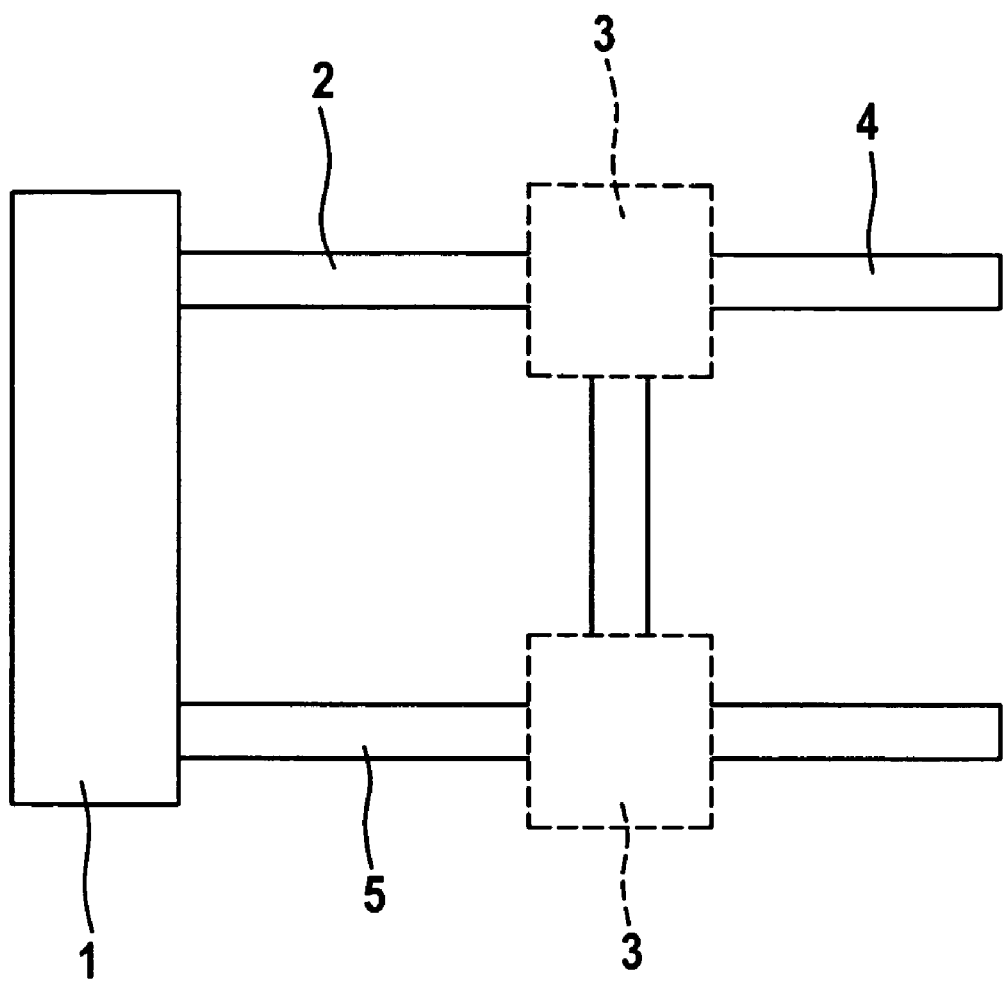
FIG. 1 shows a schematic sketch of a section of an internal combustion engine, including a turbocharger.

FIG. 1 shows a section of an internal combustion engine including a turbocharger, a combustion chamber 1, an exhaust gas tract 2, a turbocharger 3 and a lambda measuring point 4 being shown. An intake tract 5 is also shown, which supplies air compressed by turbocharger 3 to combustion chamber 1. Exhaust gas tract 2 is connected downstream from combustion chamber 1 and receives the exhaust gas from combustion chamber 1 and passes it on to turbocharger 3. There, the exhaust gas drives a turbine of turbocharger 3. The exhaust gas subsequently reaches lambda measuring point 4, where lambda value λ of the exhaust gas is measured.

A measured exhaust gas temperature T3_test is measured in the exhaust gas tract by an exhaust gas temperature sensor, which is not illustrated. The lambda sensor at lambda measuring point 4 is also not illustrated in detail. However, these sensors are generally known to those skilled in the art. The method according to the present invention is used to prevent overheating of turbocharger 3 due to excessive heating by the exhaust gas supplied in exhaust gas tract 2, or it is used for the highly dynamic determination of the temperature of the exhaust gas in exhaust gas tract 2. This is achieved by using measured values of lambda measuring point 4, which has a lambda sensor which is much more dynamic in comparison to the exhaust gas temperature sensor.

Figure 2:
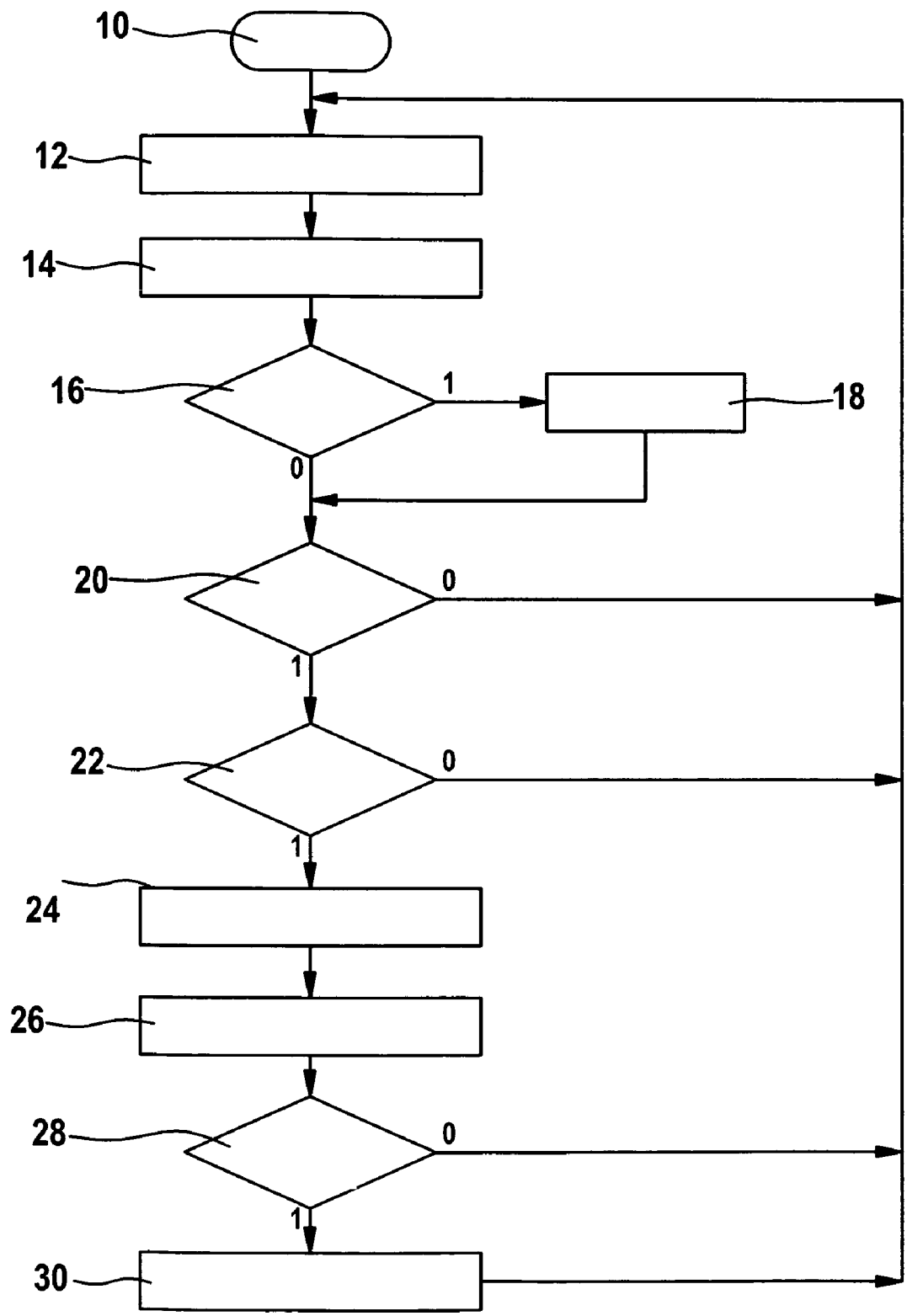
FIG. 2 shows a schematic diagram of a method according to the present invention.

FIG. 2 shows an exemplary embodiment of the method according to the present invention. The figure description in FIG. 2 generally refers to the schematic illustration of a section of the internal combustion engine shown in FIG. 1, so that reference numerals 1 through 5 used in the figure description in FIG. 2 designate the corresponding parts shown in FIG. 1.

The method begins with a step 10. Lambda value λ measured by the lambda sensor at lambda measuring point 4 is subsequently queried in a step 12. This measured lambda value λ is used in a step 14 to calculate a calculated exhaust gas temperature T3_calc, which is intended to represent the exhaust gas temperature actually prevailing in exhaust gas tract 2 of FIG. 1. A step 16 is then used to check whether calculated exhaust gas temperature T3_calc exceeds a threshold value for exhaust gas temperature T3_tresh. If this temperature is exceeded, there is danger of turbocharger 3 overheating. If it is established in step 16 that the threshold value for exhaust gas temperature T3_tresh was exceeded, a variation of at least one combustion parameter of the internal combustion engine is carried out in a step 18, for example the throttle valve position is varied to reduce the temperature prevailing in exhaust gas tract 2 and to thereby avoid overheating.

In any case, the method continues after step 16 or step 18 to check in a step 20 whether an essentially steady-state operation of the internal combustion engine is taking place. If an essentially steady-state operation of the internal combustion engine is not taking place, the method returns to step 12. If an essentially steady-state operation of the internal combustion engine is taking place, step 22 is used to check whether a value pair of a calculated exhaust gas temperature T3_calc and a measured exhaust gas temperature T3_test, i.e., an interpolation point for an adaptation, is present at the essentially steady-state operating point of the internal combustion engine. The vicinity of the instantaneous operating point within a defined tolerance range is also examined for existing interpolation points. This is done to prevent an excessive number of interpolation points from being present in the tolerance range and thereby providing an adaptation which does not require an unnecessary amount of computing effort. If calculated exhaust gas temperature T3_calc was calculated at an operating point which is situated at an adequately great distance from areas already filled with interpolation points, exhaust gas temperature T3_test is subsequently measured in a step 24 at the instantaneous operating point of the internal combustion engine (step 24). If the operating point of the internal combustion engine is presently in an area in which interpolation points or at least one interpolation point is/are already present, the method returns to step 12.

Following step 24, a further interpolation point for a possible adaptation of the function calculation used in step 14 is ascertained in a step 26 by comparing measured exhaust gas temperature T3_test with calculated exhaust gas temperature T3_calc.

A step 28 is used to check whether an adequate number of interpolation points is already present, i.e., whether an adequate number of comparisons has been carried out to perform an adaptation of subfunction a(1/λ, n) of the function illustrated above (3). The fact that extreme operating points may under some circumstances never result in an interpolation point must be taken into account, since steady-state operation of the internal combustion engine does not usually occur at these extreme operating points. This is also dependent on the operating behavior of a driver of a vehicle which is driven by the internal combustion engine. If it is established in step 28 that an adequate number of interpolation points is present, the method moves on to a step 30 in which function a(1/λ, n) is adapted. Otherwise, the method returns to step 12 following step 28. After step 30, that is, after adapting the aforementioned subfunction, the method also returns to step 12 and starts over.

The invention claimed is:

1. A method for determining an exhaust gas temperature of an internal combustion engine, the method comprising:
    measuring, using a lambda sensor, a lambda value of the exhaust gas of the internal combustion engine during an essentially steady-state operation of the internal combustion engine;
    determining, by an engine controller, an exhaust gas temperature as a function of the measured lambda value using a functional relationship between the exhaust gas temperature and the lambda value; and
    using the engine controller, comparing the determined exhaust gas temperature with an exhaust gas temperature measured during the essentially steady-state operation of the internal combustion engine, and adapting, as a function of the comparison, the functional relationship between the exhaust gas temperature and the lambda value, wherein the adapting includes adjusting a parameter of the functional relationship.

2. The method of claim 1, wherein a plurality of comparisons is performed, the adaptation of the functional relationship including at least one of an interpolation between these comparisons and an extrapolation beyond these comparisons.

3. The method of claim 1, wherein at least one of a rotational speed of the internal combustion engine, an intake air temperature of the internal combustion engine, and a temperature of the internal combustion engine are also parameters of the functional relationship.

4. The method of claim 1, wherein the functional relationship includes subfunctions, and only a fraction of all the subfunctions are adapted.

5. The method of claim 4, wherein one of the adapted subfunctions has at least one of the lambda value and the rotational speed of the internal combustion engine as parameters.

6. The method of claim 4, wherein at least one of the subfunctions is determined ahead of time on a different internal combustion engine.

7. A method for thermally protecting a turbocharger of an internal combustion engine, the method comprising:
    measuring, using a lambda sensor, a lambda value of the exhaust gas of the internal combustion engine during an essentially steady-state operation of the internal combustion engine;
    determining, by an engine controller, an exhaust gas temperature as a function of the measured lambda value using a functional relationship between the exhaust gas temperature and the lambda value;
    using the engine controller, comparing the determined exhaust gas temperature with an exhaust gas temperature measured during the essentially steady-state operation of the internal combustion engine, and adapting, as a function of the comparison, the functional relationship between the exhaust gas temperature and the lambda value, wherein the adapting includes adjusting a parameter of the functional relationship;
    using the engine controller, checking whether the calculated exhaust gas temperature has exceeded a determined threshold value; and using the engine controller, varying one combustion parameter of the internal combustion engine, if the check indicates an overshooting, so that the exhaust gas temperature drops below the threshold value.

8. A control unit for determining an exhaust gas temperature of an internal combustion engine, comprising:
- a lambda sensor to measure a lambda value of the exhaust gas of the internal combustion engine during an essentially steady-state operation of the internal combustion engine;
- a determining arrangement to determine an exhaust gas temperature as a function of the measured lambda value using a functional relationship between the exhaust gas temperature and the lambda value;
- a comparing arrangement to compare the determined exhaust gas temperature with an exhaust gas temperature measured during the essentially steady-state operation of the internal combustion engine; and
- an adapting arrangement to adapt, as a function of the comparison, the functional relationship between the exhaust gas temperature and the lambda value, wherein the adapting includes adjusting a parameter of the functional relationship.

9. A non-transitory computer readable medium having a computer program including program codes which, when executed on a processor, execute a method for determining an exhaust gas temperature of an internal combustion engine, the method comprising:
- determining, using a lambda sensor, a lambda value of the exhaust gas of the internal combustion engine during an essentially steady-state operation of the internal combustion engine;
- determining an exhaust gas temperature as a function of the measured lambda value using a functional relationship between the exhaust gas temperature and the lambda value; and
- comparing the determined exhaust gas temperature with an exhaust gas temperature measured during the essentially steady-state operation of the internal combustion engine, and adapting, as a function of the comparison, the functional relationship between the exhaust gas temperature and the lambda value, wherein the adapting includes adjusting a parameter of the functional relationship.

* * * * *